J. J. H. STURMEY.
VARIABLE SPEED GEARING.
APPLICATION FILED MAR. 13, 1911.

1,028,916.

Patented June 11, 1912.
4 SHEETS—SHEET 1.

WITNESSES:
J. C. Sanders
John A. Percival

INVENTOR:
John James Henry Sturmey
BY
ATT'Y

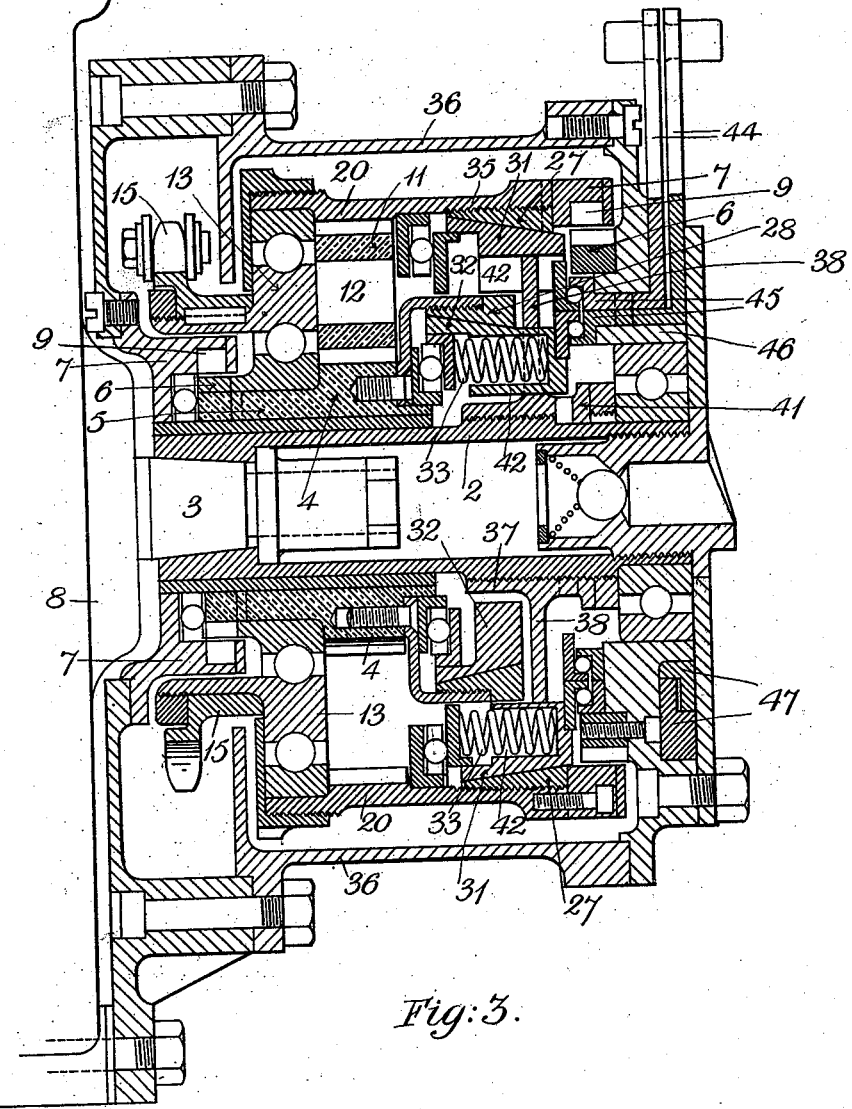
Fig: 3.

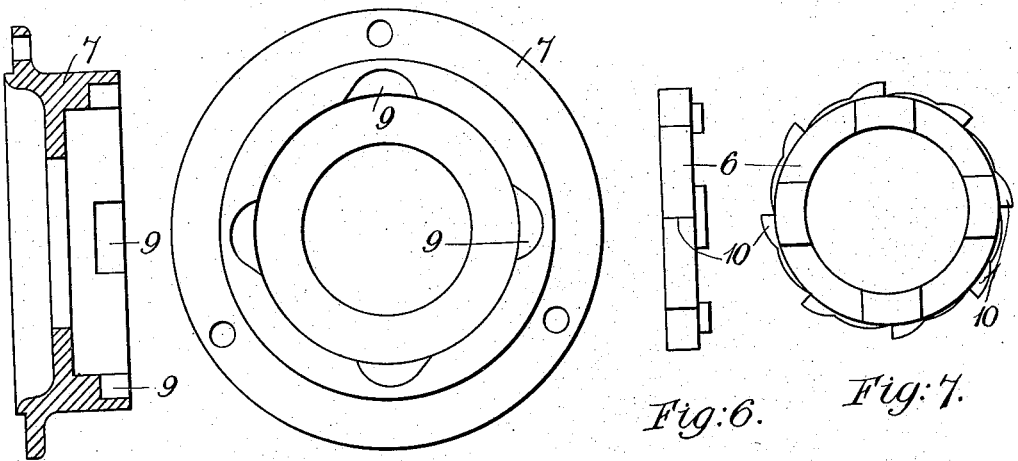
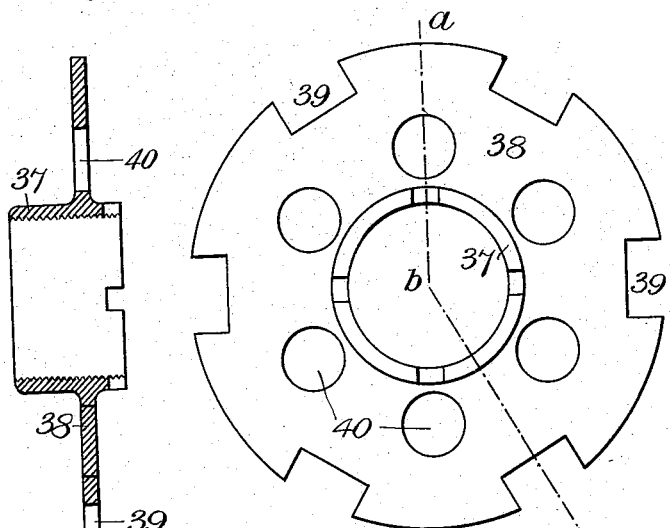
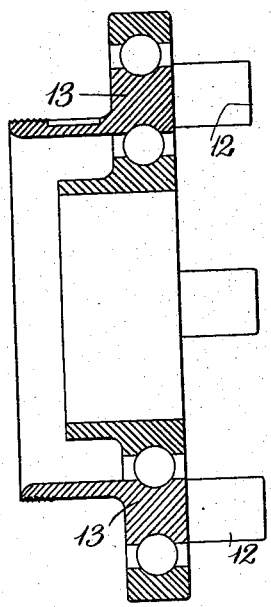
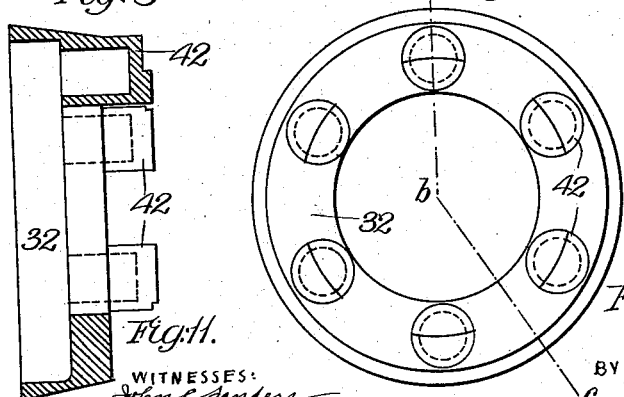

J. J. H. STURMEY.
VARIABLE SPEED GEARING.
APPLICATION FILED MAR. 13, 1911.

1,028,916.

Patented June 11, 1912.
4 SHEETS—SHEET 4.

WITNESSES:
John C. Sanders
John A. Percival

INVENTOR:
John James Henry Sturmey
BY
ATT'Y

200
UNITED STATES PATENT OFFICE.

JOHN JAMES HENRY STURMEY, OF COVENTRY, ENGLAND.

VARIABLE-SPEED GEARING.

1,028,916.   Specification of Letters Patent.   Patented June 11, 1912.

Application filed March 13, 1911. Serial No. 614,213.

*To all whom it may concern:*

Be it known that I, JOHN JAMES HENRY STURMEY, subject of Great Britain, residing at Coventry, Warwickshire, England, have invented new and useful Improvements in Variable-Speed Gearing, of which the following is a specification.

This invention has for its object certain new and useful improvements in variable speed gearing and consists in the construction, combination, and arrangement of devices hereinafter described and claimed and illustrated in the accompanying drawings in which—

Figure 1:
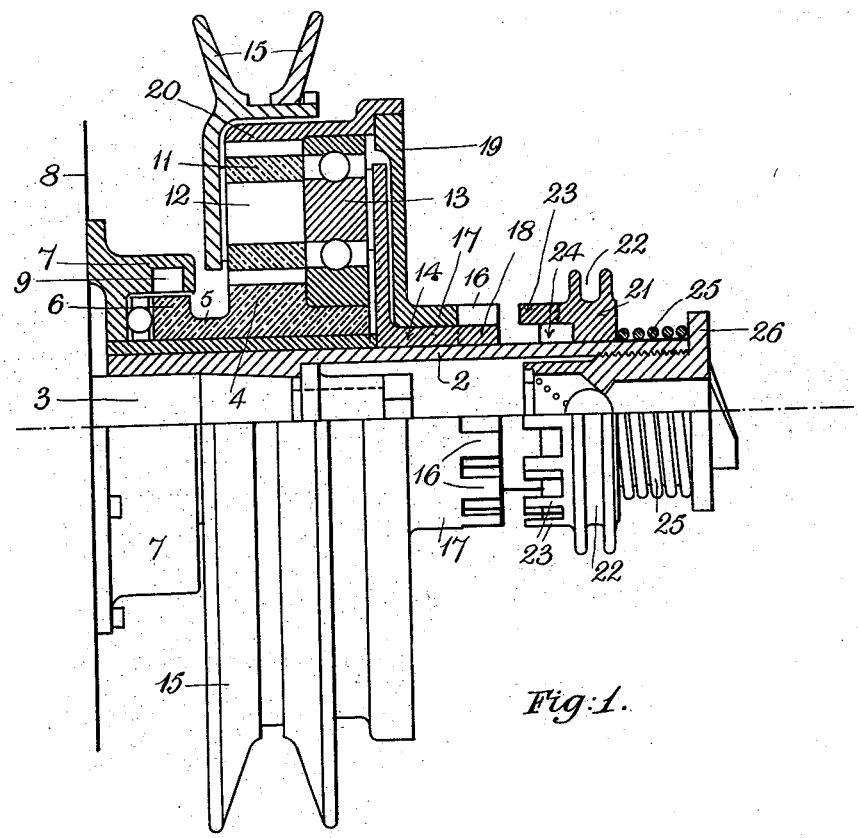
Figure 2:
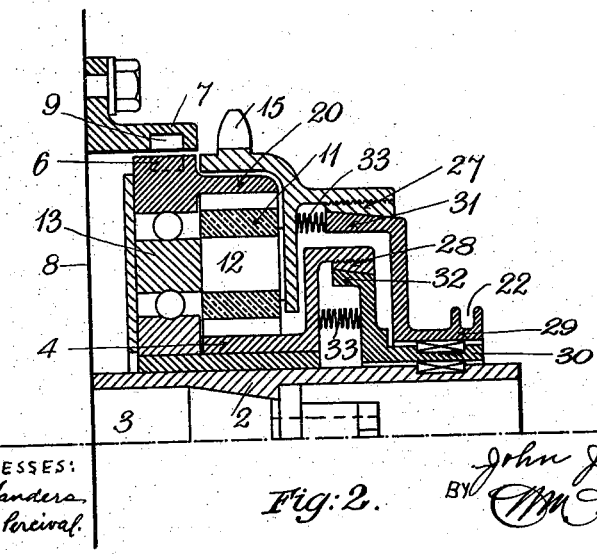
Figure 13:
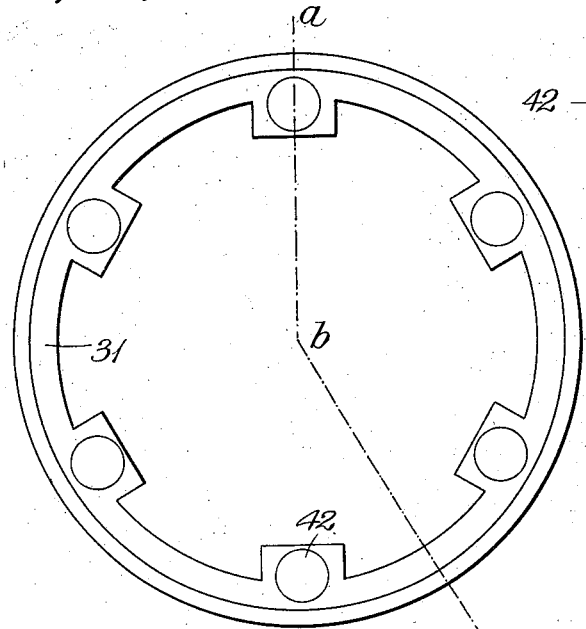
Figure 14:
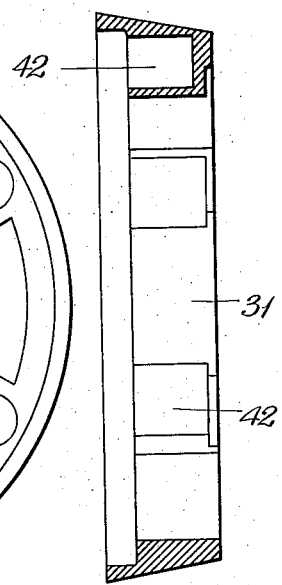
Figure 15:
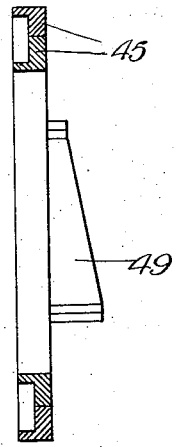
Figure 16:
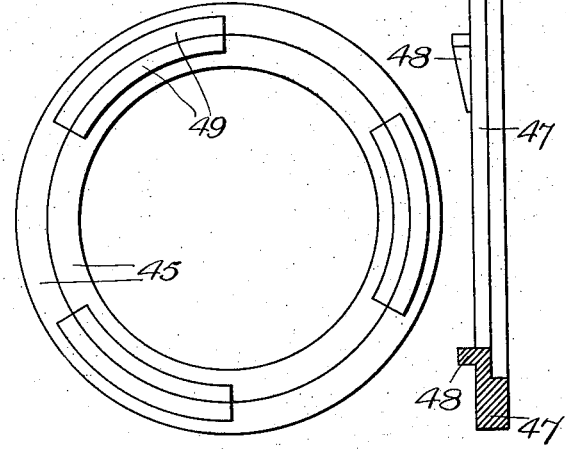
Figure 17:
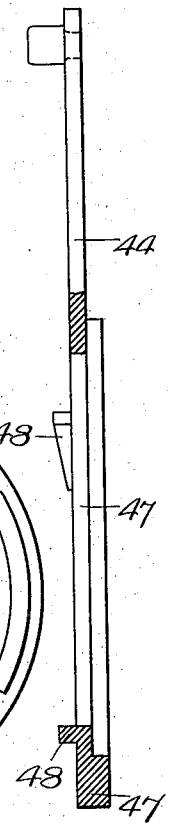
Figure 18:
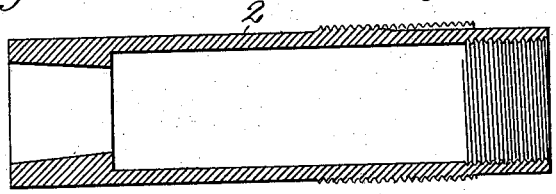

Figure 1, is a part sectional elevation of a variable speed attachment embodying the present invention and giving two speeds and a free engine. Fig. 2, is a sectional view of one half of an alternative construction giving two speeds and a free engine. Fig. 3, is a view similar to Fig. 1, but wholly in section of a variable speed attachment giving three speeds, and a free engine. Figs. 4 and 5, illustrate in sectional and side elevations respectively the fixed clutch box for the sun wheel. Figs. 6 and 7, are edge and side elevations respectively of the ratchet ring of the one-way clutch carried by the sun wheel. Figs. 8 and 9 are sectional and side elevations respectively of the friction clutch driver, Fig. 8, being taken on line $a$, $b$, $c$, Fig. 9. Fig. 10, is a detail sectional view of the pinion and sprocket carrier in the main ball race. Figs. 11 and 12, are sectional and side elevations respectively of the inner friction clutch member for the sun wheel; Fig. 11, is taken on line $a$, $b$, $c$ Fig. 12. Figs. 13 and 14 are elevation and sectional views respectively of the inner clutch member for the annulus, Fig. 14 is taken on the line $a$, $b$, $c$ of Fig. 13. Figs. 15 and 16 are sectional and side views respectively of the concentric cam rings for the friction clutches. Fig. 17, is a detail sectional view of one of the clutch actuating levers, and Fig. 18, is a detail sectional view of the crank shaft extension.

Throughout the drawings like parts are designated by similar reference characters.

The object of the invention is to provide a speed changing device which shall give two or more speeds or gear ratios between the engine and the driving wheel and which shall at the same time provide means for the entire disconnection of the engine from the driving gear.

A variable gear attachment constructed according to this invention may also be carried by a bracket or the like arranged intermediate the driving and driven shafts or again the gearing may be inclosed within the hub of the driving road wheel of a cycle or motorcycle in which latter case the pinion carrier would rotate with the hub shell and the clutch ring or rings for the one-way clutch or clutches would be carried by the frame of the machine or by the fixed spindle, or in the case of a three speed gear, by each of them.

The constructions of variable gear attachment hereinafter described are all designed more especially for use in connection with the driving gearing of motorcycles. It is however to be understood that the attachment may as already stated be adapted for other purposes where a variable transmission of power is required.

In each case the attachment as a whole is preferably supported upon a central tubular extension piece 2, Fig. 18, which is adapted to be keyed or otherwise rigidly secured to the engine or other driving shaft 3 in place of the usual belt pulley.

Referring to the construction shown in Fig. 1, and which is designed to provide two speeds and a free engine, the sun wheel 4 of the epicyclic gearing is mounted loosely upon a bush on the extension 2 and carries on its inner face a shoulder or short sleeve 5. This shoulder or sleeve carries or is formed with a ratchet ring 6, Figs. 6 and 7, which is adapted to rotate within a clutch box 7, Figs. 4 and 5, carried on the crank case 8 and having recesses 9 for the pawls or the like adapted to engage with the teeth 10 of the said ring so as to form therewith a one-way clutch. The clutch operates in a direction opposite to that which is the direction of movement of the driving pulley when in use and its action is hereinafter described. Engaging with the sun wheel 4 are one or more planet pinions 11 rotatably mounted on bearing pins 12 carried by a carrier or cage 13. The said carrier may be formed as a collar or vertical flange and is attached to a sleeve 14 adapted to rotate freely upon the crankshaft extension 2 beyond or outside of the sun wheel. The belt pulley 15 which may be of the laterally adjustable type to provide compensation for the stretch of the belt, is mounted upon the inner ends of the bearing pins 12 carrying the pinions 11.

The outer end of the sleeve 14 is in this construction provided with a jaw clutch 18 of any suitable form whereby the sleeve may be locked to the crankshaft extension 2 and hence to the driving shaft 3. Upon this sleeve 14 is mounted a second sleeve 17 free to revolve upon it and likewise furnished at its outer end with a jaw clutch 16 for the same purpose. The inner end of this second sleeve is provided with a vertical ring collar or flange 19 which either carries or is formed into an annulus or internally toothed ring 20 which forms the outer member of the epicyclic gearing and incloses and meshes with the planet pinions 11. The means employed for locking either or both of said sleeves 14 and 17 in driving connection with the crankshaft extension 2 consists of a boss or collar 21 which is mounted on and in sliding connection with the outer end of the said extension. The said collar is formed at its outer end with a groove 22 for the reception of the jawed end of an actuating lever (not shown) while its inner face is formed with stepped clutch pieces 23, 24 adapted to engage with the correspondingly jawed ends 16, 18 of the two sleeves respectively. The collar 21 has thus three positions viz., (a) out of engagement with either of the two sleeves 14, 17, (b) in engagement with the annulus sleeve 17, and (c) in engagement with both the annulus sleeve and the pinion and pulley carrying sleeve, the action being as follows,—In position (a) the engine is out of driving connection with the transmission mechanism and what is known as a "free engine" is obtained. In position (b) the pinion carrier 13 is disconnected from and the annulus 20 connected with the engine shaft. The action of rotating the annulus causes the pinions 11 to revolve in the same direction and these in their turn to rotate the sun wheel 4 in the opposite direction, but the latter being prevented by the one-way clutch 6, 7 from moving in that direction at all, becomes automatically locked to the engine casing, with the result that the pinions are forced to travel around it in a forward direction, with a reducing result upon the speed of travel of the bearings upon which they revolve and hence of the belt pulley 15 and a low or reduced gear ratio is obtained. When the parts are in position (c) both the annulus 20 and the pinion carrier 13 are in engagement with and driven by the engine and hence the whole gear rotates together as a mass and the direct or high gear is obtained. As the latter position will be that most frequently occupied it is preferred to make that the "normal" position of the parts and hold the collar 21 in position by a spring 25 reacting against a collar 26 mounted upon the extreme end of the extension piece 2.

Where fairly high reductions of gear ratios are desired it is preferred to connect the annulus 20 instead of the sun wheel 4 with a one-way clutch 7 attached to the crank case as shown in the alternative construction in Fig. 2, and to mount the said sun wheel upon a sleeve running loosely upon the extension piece 2. Where dog clutches are employed as in Fig. 1 the pulley or chain wheel 15 and the gear pinions 11 would in this case be carried by or connected to a sleeve running upon the sun wheel sleeve.

In order to avoid the sudden action resulting from the engagement of dog clutches, friction clutches may be substituted therefor as shown in Fig. 2. In this case the outer faces of the sun wheel and carrier 13 are formed into and have mounted upon them disks or flanges having coned clutch surfaces 27, 28 respectively, and instead of the single sliding clutch collar 21 shown in Fig. 1, two concentric collars 29, 30 are employed each carrying at their inner ends the male friction clutch members 31, 32. The clutch member 32 on the inner collar 30 is adapted to engage with the clutch surface 28 on the sun wheel 4, Fig. 2, and the clutch member 31 on the outer collar 29 engages with the clutch surface 27 on the annulus and pinion carrier 13. The two clutches being normally held in engagement by means of springs 33 within the clutch cases.

The inner clutch collar 30 is mounted in slidable connection with and driven by the crankshaft extension 2 and the outer collar 29 is likewise mounted in sliding connection on the inner collar, and upon the outer end of the outer collar is formed the groove 22 for the jawed end of the actuating lever. A small space is left between the inner ends of the two collars 29, 30 so that movement inward of the operating lever first forces the outer or pinion carrier clutch out of engagement when the low speed is obtained and then by further movement inward brings the outer collar 29 against the inner collar 30 thus forcing the inner or sun wheel clutch out of engagement and a "free engine" is obtained.

In the application of friction clutches operated by concentric collars as above described to the construction of gearing shown in Fig. 1, the inner collar will operate the inner or pinion carrier clutch and the outer collar the outer or annulus clutch, the inner collar being adapted to be moved first to release the pinion carrier clutch so as to give the low speed and then on being moved farther inward to operate the outer collar thus releasing the annulus clutch and providing a free engine. Here also the two clutches would be normally held in engagement by springs within the clutch cases as in Fig. 2.

A gearing embodying this invention may also be arranged to give two reductions of gear ratio instead of one only thus providing a three speed gearing together with a free engine. In this construction, Fig. 3, the chain wheel or belt pulley 15 is carried by the pinion carrier and the sun wheel 4 is loosely mounted upon the crank shaft extension 2 and connected to the engine crank case by a one-way clutch 6, 7. The outer sleeve 35 carrying the annulus may form a casing as shown, to inclose the clutches and in order to arrest backward motion of the annulus 20 the said sleeve is provided with a stop or detent or other device which may take the form of a one-way clutch similar to that employed for the sun wheel as shown, the ratchet ring 6 being in this case carried by the outer fixed casing 36 which incloses the whole of the gearing and is bolted to the engine crank case, while the clutch box 7 is carried by the sleeve 35. The said outer sleeve 35 carrying the annulus, and the sun wheel 4 are each provided with cone clutch surfaces 27, 28 adapted to be engaged by corresponding male clutch pieces 31, 32 carried by a clutch driver 37 which is screwed onto and rotates with the crankshaft extension 2. The said driver is shown in detail in Figs. 8 and 9 and comprises a vertical plate or flange 38 having peripheral notches or castellations 39 to engage with the outer male clutch member 31 and a series of holes 40 to engage with the inner male clutch member 32. The said driver is locked from rotation relatively to the extension 2 by means of a driving ring 41, Fig. 3. The male clutch members 31, 32, Figs. 11 and 12 and 13 and 14 are each provided with sockets 42 for the reception of the clutch springs 33, said sockets also at the same time serving as driving dogs and engaging the notches 39 and holes 40 in the clutch driver 37. The action of this gearing is as follows:—When both clutches are engaged the sun and annulus portions of the gearing are locked together. The gearing revolves *en masse* and the direct or high speed is obtained. When the clutch in connection with the sun wheel is freed, the one in connection with the annulus being engaged the first reduction is obtained, the one-way clutch automatically providing for the resistance of the sun wheel. When the clutch engagement is reversed, that is to say, when that in connection with the annulus is freed, while the one in connection with the sun wheel remains in engagment, the reverse movement of the annulus is arrested by the one-way clutch or other holding device, and the second or lowest reduction of the speed ratio is obtained. When both clutches are out of engagement the engine is "free" as before. The means employed in this construction for operating the friction clutches 31, 32 to give the above described variation in speed comprises a pair of clutch levers 44, one of which is shown in detail in Fig. 17, in combination with clutch cam rings 45, Figs. 15 and 16.

The clutch levers are as shown in Fig. 3 rotatably mounted in the cover plate 46 of the gear casing 36 with their bosses 47 arranged concentrically with each other. The inner ends of these bosses are provided or formed with face cams 48 adapted to engage with corresponding cams 49 on the outer face of the concentric clutch cam rings 45. The said cam rings abut against the inner and outer male clutch members 31, 32 and the arrangement of the cams thereon with respect to the face cams on the bosses of the operating levers is such that when one of said levers is moved the co-action of the cams thereon with the cams on the corresponding cam rings forces said ring and hence the corresponding clutch member inward thus releasing one of the clutches. Similarly movement of the other lever brings about the disengagement of the other clutch and vice versa.

What I claim and desire to secure by Letters Patent of the United States is:—

1. Variable speed gearing comprising a driving shaft, epicyclic gearing mounted loosely thereon, a power transmission member carried by said gearing mechanism for releasably connecting the epicyclic gearing with the driving shaft, and one-way clutch devices for preventing backward rotation of the extreme members of the epicyclic gearing.

2. Variable speed gearing comprising a driving shaft, epicyclic gearing mounted loosely thereon, a power transmission member carried by the intermediate member of the epicyclic gearing, mechanism for releasably and severally connecting members of the epicyclic gearing with the driving shaft, and a one-way clutch device for automatically arresting backward rotation of one of the extreme members of the epicyclic gearing when the other is locked to the driving shaft.

3. Variable speed gearing comprising a driving shaft, a sun wheel mounted loosely thereon, planet pinions meshing with said sun wheel, a planet pinion carrier, a power transmission member secured to said carrier, an internally toothed annulus meshing with the planet pinions, means for releasably locking the sun wheel and the internally toothed annulus to the driving shaft, and a one-way clutch device for preventing backward rotation of the sun wheel when the annulus is locked to the driving shaft.

4. Variable speed gearing comprising a driving shaft, a sun wheel mounted loosely thereon, planet pinions meshing with said sun wheel, an internally toothed annulus meshing with the planet pinions, a planet pinion carrier, a power transmission member in driving connection with said carrier, means for releasably locking the annulus and the sun wheel to the driving shaft, and a one-way clutch device for preventing backward rotation of the annulus when the sun wheel is locked to the driving shaft.

5. Variable speed gearing comprising a driving shaft, a sun wheel mounted loosely thereon, planet pinions meshing with said sun wheel, a planet pinion carrier, a power transmission member in driving connection with said carrier, an internally toothed annulus meshing with said pinions, means for releasably locking the annulus and sun wheel to the driving shaft, and a one-way clutch device for preventing backward rotation of the sun wheel when the annulus is locked to the driving shaft, and a one-way clutch device for preventing backward rotation of the annulus when the sun wheel is locked to the driving shaft.

6. Variable speed gearing comprising a driving shaft, a sun wheel mounted loosely thereon, planet pinions meshing with said sun wheel, a planet pinion carrier, a power transmission member in driving connection with said carrier, an internally toothed annulus meshing with said pinions, clutch members carried by the annulus and the sun wheel, corresponding clutch members in driving connection with the driving shaft and adapted to engage with the clutch members on the annulus and sun wheel respectively, a one-way clutch device adapted to arrest backward rotation of the sun wheel when the annulus is locked to the driving shaft, and a one-way clutch device adapted to arrest backward rotation of the annulus when the sun wheel is locked to the driving shaft.

7. A variable speed gear attachment comprising in combination a tubular extension piece, a driving shaft, a sun wheel loosely mounted on said extension and carrying a clutch member, planet pinions meshing with said sun wheel, a pinion carrier, a power transmission member on said carrier, an internally toothed annulus meshing with said planet pinions and carrying a clutch member, clutch members on and in driving connection with said extension, and means for holding them in engagement with both of the clutch members on the sun wheel and annulus, means for severally withdrawing said clutch members out of such engagement, a one-way clutch device for arresting backward rotation of the sun wheel when the annulus is locked to the said extension and a one-way clutch device for arresting backward rotation of the annulus when the sun wheel is locked to the driving shaft.

8. A variable speed gear attachment comprising in combination a tubular extension piece, a driving shaft, a sun wheel loosely mounted on said extension and carrying a clutch member, planet pinions meshing with said sun wheel, a pinion carrier, a power transmission member on said carrier, an internally toothed annulus meshing with said planet pinions and carrying a clutch member, a carrier plate mounted on and in driving connection with said extension, slidable clutch members carried by said plate and normally held in engagement with the clutch members on the sun wheel and annulus, cam rings carried by said slidable clutch members, and operating levers having cam faced bosses adapted to co-act with said cam rings to severally disengage the slidable clutch members from the corresponding clutch members on the sun wheel and annulus, and one-way clutch devices adapted to arrest backward rotation of the sun-wheel and the annulus.

In testimony whereof I have signed my name to this specification in the presence of two subscribing witnesses.

JOHN JAMES HENRY STURMEY.

Witnesses:
R. WESTACOTT,
H. D. JAMESON.

---

Copies of this patent may be obtained for five cents each, by addressing the "Commissioner of Patents, Washington, D. C."